United States Patent [19]

Foglia

[11] Patent Number: 4,885,747

[45] Date of Patent: Dec. 5, 1989

[54] BROADBAND AND BASEBAND LAN

[75] Inventor: Henry R. Foglia, Raleigh, N.C.

[73] Assignee: International Business Machines Corp., Armonk, N.Y.

[21] Appl. No.: 156,763

[22] Filed: Feb. 17, 1988

[51] Int. Cl.$^4$ .............................................. H04J 1/00
[52] U.S. Cl. ..................................... 370/123; 370/124; 455/3; 358/86
[58] Field of Search .................... 370/124, 123, 76, 71, 370/72; 358/86; 455/3, 5, 6; 381/81

[56] References Cited

U.S. PATENT DOCUMENTS

| 4,077,006 | 2/1978 | Nicholson | 455/3 |
| 4,564,940 | 1/1986 | Yahata | 370/124 |
| 4,675,866 | 6/1987 | Takumi et al. | 370/124 |
| 4,764,922 | 8/1988 | Dieter et al. | 320/123 |

Primary Examiner—Joseph A. Orsino
Assistant Examiner—Frank M. Scutch, III
Attorney, Agent, or Firm—Joscelyn G. Cockburn

[57] ABSTRACT

Described is a communications system for transmitting baseband and broadband signals simultaneously. The system is ideally suited for interconnecting different types of data terminal equipment (DTE) within a building or limited geographical area. The system includes a backbone communications network formed from a plurality of independent communications systems. Each of the plurality of independent communications systems is dedicated to transmit either the baseband signals or the broadband signals. A Filter Coupler (FC) network combines and separates the two different type of signals at the distribution level. One embodiment of the FC includes a filter network coupled in tandem with a high frequency transformer. In an alternate embodiment the FC includes a balun transformer coupled to a directional coupler transformer.

26 Claims, 4 Drawing Sheets

BROADBAND AND BASEBAND LAN

BACKGROUND OF THE INVENTION

1. Field of the Invention

The present invention relates to communications systems in general and, more particularly, to local area networks (LANs) which transmit high frequency and low frequency signals.

2. Prior Art

Because of the different types of machines which are now available for use in the home and in the office, the need arises for a common communications system which is able to transmit mixed information. The prior art has recognized the need for such a system and has provided the so-called Data Over Voice (DOV) communications system.

The DOV communications system is a known technique for simultaneously transmitting and receiving an analog voice signal and a digital data signal through a common 2-wire signal line. This is a band division system in which the digital data is FSK modulated on a high frequency carrier signal and is superimposed on a signal line. Thus, it is easy to separate the high frequency FSK modulated data signal from the low frequency voice signal by a filter circuit. A more detailed description of the DOV system is set forth in U.S. Pat. No. 4,670,874. Included in the drawbacks of this system is the fact that it provides limited bandwidth usage. Thus, certain frequencies within the transmission spectrum are not available for use.

Other art teaching the transmission of two signals over the same line is set forth in U.S. Pat. No. 1,812,624. Other techniques describing the use of transformers for suppressing noise in a transmission line are set forth in U.S. Pat. No. 3,223,920.

SUMMARY OF THE INVENTION

It is, therefore, the general object of the present invention to provide a more efficient communications system than has heretofore been possible.

It is a more particular object of the present invention to provide an improved communications system with virtual unlimited bandwidth usage for both baseband and broadband signals.

The improved communications system includes a broadband network which transmits broadband signals and a baseband network which transmits baseband signals. A first F-coupler circuit arrangement accepts the baseband and broadband signals and simultaneously concentrates said broadband signals and said baseband signals onto one end of a length of shielded twisted pair wires. A second F-coupler is coupled to the opposite end of the shielded twisted pair wires. The second F-coupler separates and distributes the broadband and baseband signals to their respective connector ports to which utilization devices are connected.

The F-coupler, in one embodiment of the invention, includes a filtering circuit which terminates in a first connector for baseband transmission and a broadband transformer, connected in tandem with the filtering circuit, which terminates in a second connector for broadband transmission. The filtering circuit includes two coils (L) arranged in spaced relationship with two ends of the coils forming an input terminal for connecting to the first connector and the other two ends of the coils forming an output terminal. Separately connected RC networks couple the output terminal to a referenced potential (preferably ground). The high frequency transformer includes three coils symmetrically arranged on a magnetic core and poled so that baseband signals are carried as a balanced signal on the twisted wire pair and the broadband signals are carried as an unbalanced signal on the twisted wire pair relative to the shield of the cable.

The passive circuitry in the above embodiment of the F-coupler effectively isolates the broadband and baseband transmission from each other in two ways. The broadband signals are blocked from getting to the first connector which is connected to the baseband signal port and the baseband signals are blocked from getting to the second connector which is connected to the broadband signal port. In addition, the high frequency transmissions from baseband machines connected to the baseband signal port are blocked from getting to the second connector. This second property is important because many machines transmitting baseband (low frequency) signals will also transmit spurious high frequency (broadband) signals which do not affect baseband operaton but could interfere with broadband transmission sharing the same cable.

In an alternate embodiment, the F-coupler includes a balun transformer with a pair of windings having inputs terminating in a baseband signal port and a pair of output terminals each one connected via individual capacitors to a referenced potential. A directional coupling transformer having a single ended winding connects to a broadband signal port and a pair of in-line windings coupled to the output terminals of the balun transformer. The balun transformer ensures that baseband signal is propagated in a balanced mode while the directional coupling transformer ensures that broadband signal is propagated in an unbalanced mode.

The F-coupler provides excellent noise suppression and signal separation so that baseband signals and/or noise which are coupled to the baseband signal port do not adversely affect (i.e., interfere) devices coupled to the broadband signal port. Similarly, broadband and/or noise signals which are coupled to the broadband port do not interfere with devices coupled to the baseband port.

These and other objects and advantages of this invention will be more fully described in the accompanying drawings.

DETAILED DESCRIPTION OF THE PREFERRED EMBODIMENT

Figure 1:
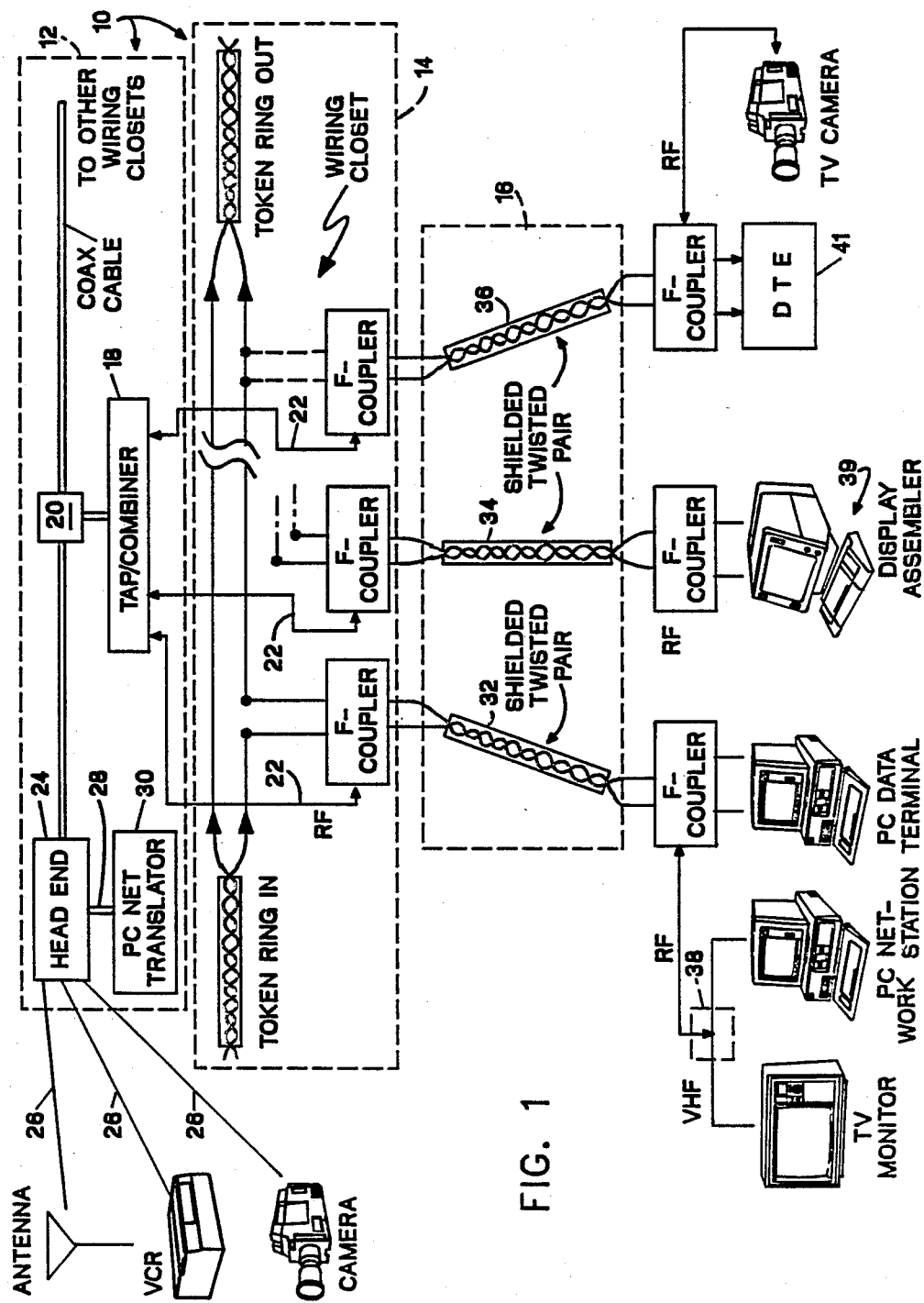
FIG. 1 shows a schematic of the improved communications system according to the teachings of the present invention.

FIG. 1 is a schematic of the communications system according to the teachings of the present invention. The communications system of FIG. 1 includes a backbone communications network 10 formed from broadband communications network 12 and baseband communications network 14. As is used in this application, a backbone communications network means an electrical signal transmission facility which is not directly connected to the user machines. Also, baseband signals mean information transmission within the frequency range of 0 to 50 MHZ and broadband signals mean information transmission within the frequency range of from 50 MHZ to 300 MHZ.

Balanced signal mode is the signal condition whereby the amplitudes of the signals applied on each of the wire of a twisted pair shielded cable are oppositely poled relative to the shield or ground.

Unbalanced signal mode is the signal condition whereby the applied signal amplitudes are likewise or similarly poled on each of the wires of a twisted pair shielded cable relative to the shield or ground.

Equally unbalanced signal mode is the signal mode whereby the signal amplitudes are likewise poled and of equal amplitude on each of the wires in the twisted pair relative to the shield or ground.

Finally, the networks which transmit the broadband and baseband signals are prefixed with the appropriate term. Thus, a broadband network transmits broadband signals and so forth.

Still referring to FIG. 1, the broadband communications network 12 is dedicated to transmitting broadband electrical signals while the baseband communications network is dedicated to transmit baseband electrical signals. The two networks together are able to transmit voice, data, image, graphics, text information, etc. The communications system of FIG. 1 merges broadband and baseband signals and delivers them on a common distribution system 16 to machines in a user's office. The broadband communications network includes a coax cable which transmits broadband signals into a tap/combiner means 18. A signal splitter connector 20 interconnects the tap combiner means 18 to the coax cable. The tap/combiner means 18 partitions the high frequency signals from the coax cable and distributes the signals on conductors identified by numeral 22. As will be explained subsequently, the high frequency signals on conductors 22 are transmitted to each office via the IBM Cabling System lobes 32, 34 and 36 (to be described subsequently) and F-couplers (to be described hereinafter). The IBM Cabling System lobes are sometimes called distribution links or lobe assembly means.

A head end signal distribution means 24 is connected to the coax cable. The head end signal distribution means 24 multiplexes high frequency signals from a plurality of transmission media identified by numeral 26. Each of the transmission media 26 is connected to different devices such as high frequency antennas, VCRs, TV cameras, etc. A length of coax cable 28 attaches an IBM PC-NETWORK translator 30 to the head end signal distribution means. The function of IBM PC-NETWORK translator 30 is to receive electrical signals at a first frequency, reproduces the signals at a higher frequency and delivers the high frequency signal to a PC (Personal Computer) broadband local area network (LAN). The broadband LAN is not shown in FIG. 1 but may be of the type described in the IBM PC-NETWORK LAN document P/N #68X2268. This type of LAN may be used for interconnecting a plurality of Personal Computers and other work stations. It should be noted that transmission media other than coax or twisted pair can be used in the backbone network. Other types of transmission media may include optical fiber, etc.

Still referring to FIG. 1, the baseband communications network 14 may include any type of communications network which transmits information within the frequency range of D.C. to 50 MHZ. A well-known communications network which transmits and/or receives information in this frequency range is the IBM Token Ring Network. The Token Ring Network includes the IBM Cabling System, attached equipment and protocols for operating the equipment on the Token Ring Network. It should be noted that the IBM Token Ring Network partially embraces the standard set forth in the IEEE 802.5 committee. Details of the IBM Cabling System (ICS) are set forth in the IBM Cabling System Planning and Installation Guide (GA27-3361-6). The manual is incorporated herein by reference. Since the ICS is fully described in the referenced manual, only those sections of the manuals which are necessary to understand the invention will be described. The ICS is a star-wired structured approach to wiring a building. The ICS includes a plurality of wiring closets, only one of which is shown in FIG. 1, interconnected in a serial loop by two pairs of twisted wires in a shield. In FIG. 1, only one pair of the twisted shielded pair wires is shown. But in actuality two pairs of shielded twisted pairs are used for 32, 34, 36. The wiring closet is the hub of each of the cabling stars. The direction of signals through the wiring closet is shown by arrows.

The wiring closet is the juncture where the backbone communications networks interface with distribution communications system 16. Distribution communications system 16 transmits both baseband and broadband signals into the customer's office or from the customer's office into the backbone communications network. The distribution communications system includes a plurality of lobe assembly means, three of which are shown in FIG. 1 and identified by numerals 32, 34 and 36. Each lobe assembly means provides transmission services to a particular attached machine or group of machines. Thus, lobe assembly means 32 provides transmission services to the attached machines. The attached machines include PC data terminal, PC network station and TV monitor. It should be noted that the TV monitor and the PC network station are operating in different high frequency range. However the RF splitter 38 distributes the high frequency signals appropriately.

Likewise, lobe assembly means 34 provides lobe transmission services to display assembly 39 which may include the 3278/9 Display Units manufactured and marketed by International Business Machines. Finally, lobe assembly means 36 provides transmission services for the attached TV camera and data terminal equipment (DTE) 41. DTE 41 includes a range of work stations and/or other machines capable of receiving and/or transmitting signals within the baseband frequency range. Each of the attached devices is fitted with appropriate adapter cards. For example, the PC data terminal is fitted with one of the following adapters:

IBM Token Ring Network PC Adapter Card P/N 6339100,

IBM Technical Requirements T.R. Network PC Adapter P/N 6165876 and P/N 69X7713 and 69X7715 and IBM Network Adapter 2 P/N 96X5663.

Still referring to FIG. 1, lobe assembly means 32 and 36 are coupled to the token ring communications media by a multi-access unit (not shown). The multi-access unit is set forth and described in U.S. patent application entitled "Local Area Network Station Connector," Ser. No. 749369, which is incorporated herein by reference. Even though two lobe assemblies are shown coupled to the token ring, the multi-access unit has the capability to attach more than two lobes. In a specific embodiment eight lobes are connected by the multi-access unit to the token ring. Since the multi-access unit is fully described in the cited reference, details of its structure and operation will not be given. Suffice it to say that the multi-access unit includes a plurality of switching arrangements with bypass relays, one of each coupling a lobe assembly to the token ring.

With reference to FIG. 1 for the moment, the bypass relay (not shown) which is associated with the lobe assembly 32 is in the closed state and interconnects lobe assembly 32 to the token ring. Likewise, the bypass relay (not shown) which is associated with lobe assembly means 36 is open, thus disconnecting the lobe from the token ring. Usually the relays disconnect the lobe wiring of inactive terminals and/or machines from the ring. Similarly, the relays interconnect lobes of active machines to the ring. In actuality the multi-access unit forms a more complex path of bypass relays but is simplified here in FIG. 1 and does not affect this invention.

It should be noted that lobe assembly means 34 is not connected to the token ring. Instead, it is connected to a concentrator unit (not shown) which is "home-run" wired to a host computer system (not shown). The connections to the multi-access unit and to the concentrators in the wiring closet are done with patched cables. Thus, rewiring associated with moving a terminal or switching a terminal from the token ring system to the host system requires a simple task of going to the wiring closet and moving a couple of patched cables. With this structure wiring approach, no new cables have to be pulled.

Still referring to FIG. 1, each of the lobe assembly means includes two pairs of twisted wires (only one of which is shown) in a shielded cable. A filter coupler (F-C) is connected to opposite ends of the twisted pair cable. One of the F-couplers receives broadband signals on conductors 22 and baseband signals from the token ring and simultaneously concentrates both signals on the respective lengths of shielded, twisted pair cables and delivers the signal to the other F-coupler. Preferably, the other F-coupler can be located at the office wall. The F-coupler at the office wall (not shown) demultiplexes the signal to the respective devices connected thereto.

Figure 2:
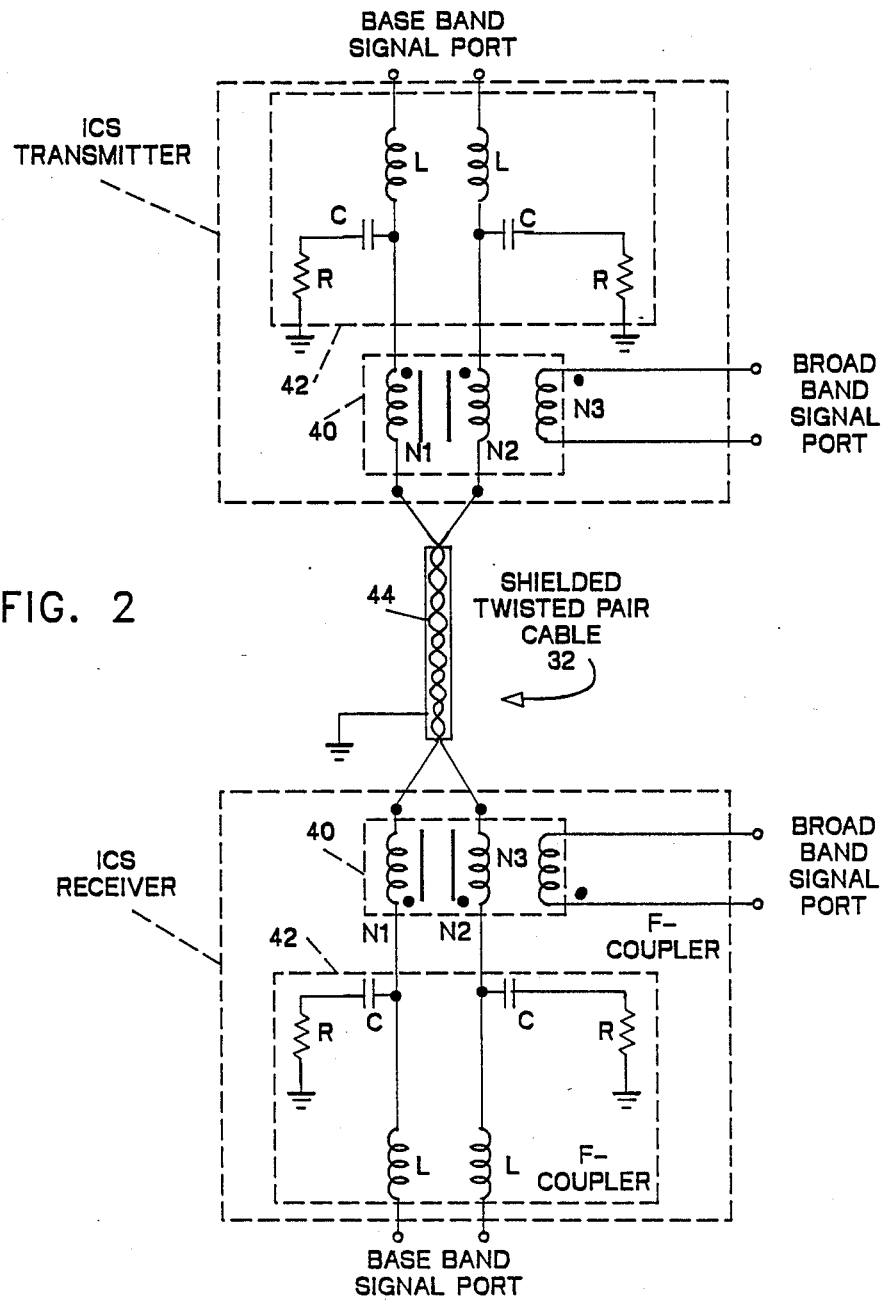
FIG. 2 shows a distribution link in the communications system and an electrical schematic of one embodiment of the F-coupler.

FIG. 2 shows the details of the F-coupler connected to opposite ends of the shielded, twisted pair cable. Since both F-couplers are identical, common numerals will be used to identify similar components in each coupler. To simplify the description, the F-coupler which is connected at the wiring closet is referred to as the ICS transmitter while the F-coupler which is connected to the device end of the twisted pair cable is identified as the ICS receiver. The F-coupler is comprised of a broadband transformer 40 connected in tandem with filter network 42. As is used in this application, broadband means a signal including the frequency range of 50 MHZ to 300 MHZ and higher. Broadband generally means high frequency bandwidth. Applications have generally confined its use to RF-CATV. Initially the bandwidth has been relegated to 50 MHZ to 300 MHZ. Today's state of the art has extended it to 450 MHZ and 600 MHZ. The low end has also been pushed down to 5 MHZ. The broadband transformer includes three windings N1, N2 and N3. The windings are identical in all respects and are arranged symmetrically on a support core. One of the windings N3 is connected through the broadband signal port to a broadband type connector which connects a broadband device such as one of those shown in FIG. 1 to the network. The broadband type connector may include any type of conventional off-the-shelf coax connector. Windings N1 and N2 are equal and tightly coupled and are poled so that baseband signals inserted at the baseband signal port are transmitted in a balanced mode on each conductor of the twisted pair. Similarly, the broadband signal which is injected at the broadband port to winding N3 is transmitted in an unbalanced mode relative to shield 44 of the shielded twisted pair cable 32.

The phenomenon of signal behavior on the twisted pair shielded wires is very important and is schematically shown by dots at windings N1 and N2. As a result of this configuration of the transformer windings, the balanced baseband signal information is passed with minimum insertion lost. However, RF signals injected at the broadband signal port are coupled equally unbalanced and travel on conductors of the twisted pair in both directions. The filter circuit arrangement includes different, but identical, L-C-R circuits arranged in each conductor of the twisted pair. The L component in each L-C-R circuit is connected to the baseband signal port which is connected to a baseband connector (not shown). The baseband connector may be of the type set forth in U.S. Pat. No. 4,501,459 and is incorporated herein by reference. In the preferred embodiment of this invention, the following values were chosen for the filter components:

L = 300 Nanohenry
R = 75 ohm and
C = 75 pf (micro-microfarad)

The values are chosen so that the inductance of coil L helps to isolate the baseband signal port above 40 megahertz while the values of C and R are chosen to minimize the terminating impedance which is shared by the terminator (not shown) at the broadband signal port.

It should be noted that since the baseband signal is balanced and the broadband signal is "equally unbalanced" on the twisted pair shielded conductor, the baseband receiver circuit is insensitive to any broadband signal that may leak. Conversely, a broadband receiver connected to the broadband signal port is insensitive to the balanced baseband data since it does not appear at the broadband signal port. Thus, while baseband data travels balanced, broadband signals travel "equally unbalanced". Thus, an F-coupler connected at each end of the shielded twisted pair cable provides the facility for injecting and extracting RF signals before reaching the baseband signal port. Recognizing and understanding this theory is key to understanding why the F-coupler is a key component of the present invention.

Furthermore, the signal attenuation for each case differs. The conductor resistance to baseband signals is in series (2R) for the balanced case, and in parallel R/2 for the unbalanced case.

The attenuation for this cable is given by $\alpha = R/2Z_o$ where R is the series resistance (which is frequency dependent) and $Z_o$ is the characteristic impedance. As will be stated later, the balance characteristic impedance $Z_{OB}$ is 3 times the unbalanced impedance, $Z_{OU}$. Thus, the attenuation for the unbalanced signal is ¾ that of the balanced case. This is a distinct advantage for broadband signals.

It should also be noted that RF transmission from baseband machines connected to the baseband signal port are blocked from getting to the coax connector (not shown) connected to the broadband signal port. This property is important because many machines transmitting baseband signals will also transmit spurious high frequency signals which do not affect baseband operation but could interfere with broadband transmission sharing the same cable.

Figure 3:
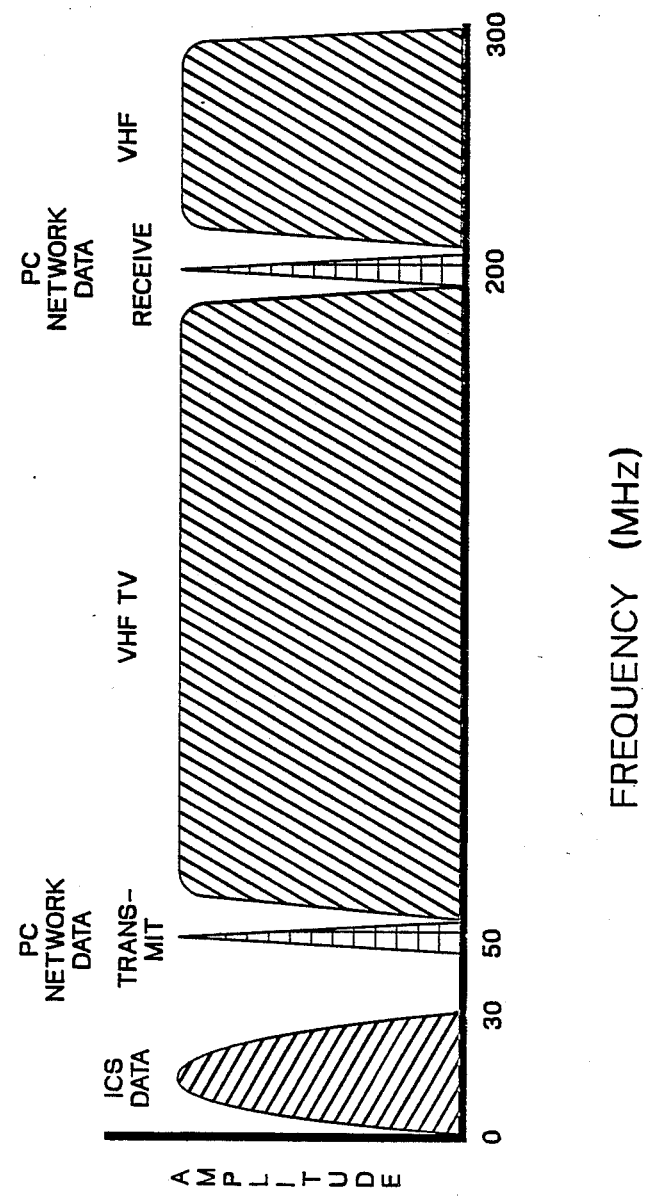
FIG. 3 shows a schematic of the signaling spectrum for different types of signals that are transmitted on the improved communications system of FIG. 1.

FIG. 3 shows a graphic representation of the signal spectrum and the allocation for data signals which are transmitted in the baseband frequency range and VHF signals which are transmitted in the broadband frequency range. The graph is helpful in understanding the relationship between signals that are simultaneously on the common lobe assembly means which interconnects the wiring closet to the office (FIG. 1). In FIG. 3, frequency is plotted on the horizontal axis and amplitude is plotted on the ordinate or vertical axis. The frequency range which transmits data for baseband machines is identified on the graph as ICS data. Information for the PC Network stations and other machines is transmitted at a transmit frequency identified in FIG. 3 as PC Network Data Transmit and is received at a higher frequency identified as PC Network Data Receive. The frequency range used by the high frequency devices is identified as VHF TV (Very High Frequency Television) and VHF, respectively. These may be typical CATV (Cable Television) signals following the NCTA (National Cable Television Association) standards for bandwidth, frequency allocation and signal amplitudes.

Figure 4:
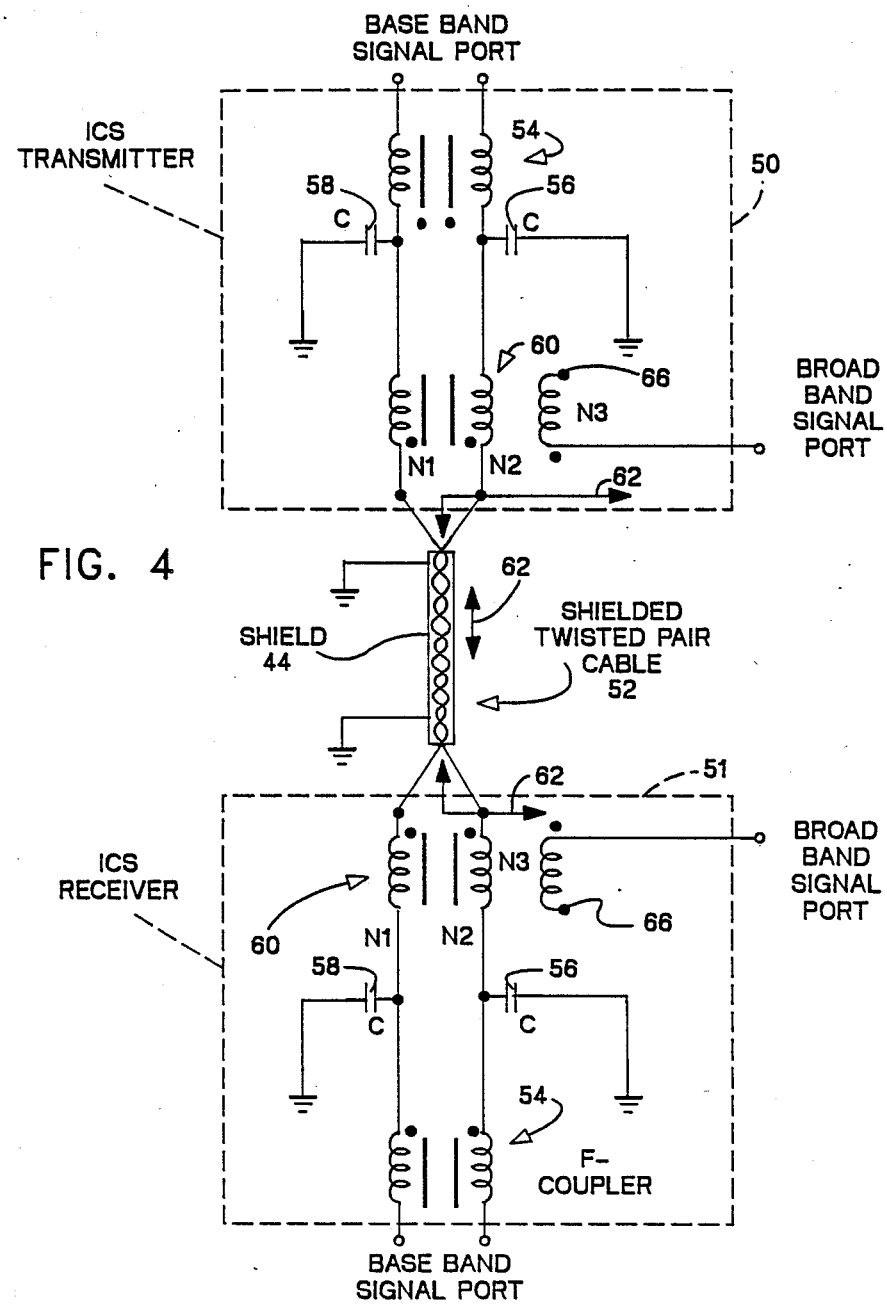
FIG. 4 shows a distribution link in the communications system and an electrical schematic of an alternate embodiment of the F-coupler.

FIG. 4 shows a distribution link with an alternate embodiment if F-couplers 50 and 51 connected to opposite ends of a length of communications media 52.

In the preferred embodiment of this invention the communications media includes a shielded twisted pair cable similar to the cable of FIG. 2. Details of this cable are set forth in IBM Cabling System Technical Interface Specification (GA2-73773) and is incorporated herein by reference. In view of this publication, only the characteristics of the cable which are germane to the present invention will be described. For balanced signals propagating along the cable, the characteristic impedance ($Z_{OB}$) is 150 ohms. Likewise, for unbalanced signals the characteristic impedance $Z_{OU}$ is 50 ohms.

As will be described subsequently, the F-coupler is provided with characteristic impedances that match those of the cable. Thus, signals that the F-coupler propagates in balanced and unbalanced modes are properly terminated. Stated another way, the F-coupler terminal that connects to low frequency devices has a characteristic impedance ($R_{OB}$) of 150 ohms. Likewise, the F-coupler terminal that connects to high frequency devices has a characteristic impedance of 50 ohms.

Still referring to FIG. 4, F-couplers 50 and 51 are identical. Thus, common numerals will be used to identify common components. The F-coupler includes a balun transformer 54 connected to a baseband signal port. As described above, devices that transmit information within the baseband signal range are connected to the baseband signal port. Capacitors 56 and 58 couple the balun transformer to a reference potential such as ground. Directional transformer 60 is coupled to the balun transformer and is connected to broadband signal port. The broadband signal port connects devices which transmit information within the broadband signal range. Broadband signals inserted at the broadband signal port of F-coupler 50 are recovered at the braodband signal port of F-coupler 51. Likewise, baseband signals inputted at the baseband signal port of F-coupler 50 are extracted at the baseband signal port of F-coupler 51. Moreover, the baseband and braodband signals are transmitted simultaneously on the twisted pair cable and occupy the same bandwidth. Also, devices transmitting broadband signals can be connected to the baseband signal port and devices transmitting baseband signals can be connected to the broadband signal port.

Still referring to FIG. 4, directional coupling transformer 60 couples signals traversing the communications link in a single direction (called the preferred direction) identified by arrows 62. Signals propagating in the opposite direction will not be coupled. Due to the unidirectional property, unbalanced signals traveling up and down the cable in FIG. 4 are efficiently coupled to the broadband windings and associated output ports. Thus, unbalanced broadband signals are confined between the two broadband ports and the cable between. Since all of the signal energy emerges out of the one end of the output winding N3 as shown, virtually no connection of the other end of this winding is necessary. Moreover, since practically all of this unbalanced signal is extracted by the directional transformer, no unbalanced signal passes beyond this point to the baseband ports. Whatever unbalanced signal that leaks to the balun is greatly attenuated by this balun which serves here as a common mode filter.

Referring again to FIG. 4, transformer 60 has three windings identified as N1, N2 and N3. Winding N3 is a single ended winding that accepts broadband signals. Windings N1, N2 and N3 are wound on a magnetic core, such as a toroid (not shown). With windings N1=N2, winding N3 may be varied in order to match termination resistor (not shown) but connected to the N3 winding.

The directional transformer is uniquely constructed to achieve directionality, excellent impedance matching for both the balanced and unbalanced signal propagating on the cable and selective signal separation. To this end, the inductance and capacitance of windings N1, N2 and N3 are controlled. For purposes of discussion, the directional coupler transformer may be considered as a broadband balun transformer with a third winding N3 positioned on the transformer support core. Windings are positioned so that the interwinding capacitance and mutual inductance between coils N1 and N2 satisfy the following expression:

$$Z_{OB} = \sqrt{L_B/C_{1,2}}$$

where $Z_{OB}$ is the characteristic impedance for balanced signal propagating through coil N1 and N2, in the presence of the third winding. $L_B$ represents mutual inductance for signal propagating in the balanced mode and $C_{1,2}$ represents mutual capacitance between coil 1 and coil 2. In the preferred embodiment of this invention, the characteristic impedance $Z_{OB}$ is chosen to be 150 ohms between windings N1 and N2 in the presence of the third winding N3.

The third winding N3 is spaced but magnetically coupled to N1 and N2 so that $$Z_{OU} = \sqrt{L_u/C_{1,2,3}}$$

where $Z_{OU}$ represents the characteristics impedance of the directional transformer operating in the unbalanced mode, $L_u$ represents the inductance between coils N1, N2 and N3, and $C_{1,2,3}$ represents the capacitance between the coils. In the preferred embodiment of this invention, $Z_{OU}$ is chosen to be 50 ohms.

The principle of directional coupling relative to transmission lines is discussed in "Directional Electromagnetic Couplers" by Bernard M. Olive, Proceedings of International Radio Engineering (I.R.E.), Vol. 42, pages 1686–1692, November 1954, and is incorporated herein by reference. As set forth in the reference for infinite directionality $R_{OU} \times R_{LU} = M_{1,2,3}$ where $R_{OU}$ is the resistive equivalent of the characteristic impedance $Z_{OU}$. With reference to FIG. 4, $R_{OU}$ is the resistor (not shown) which has to be connected to the single ended broadband signal port. $R_{LU}$ is the terminating resistor which should be connected to the floating end 66 of coil N3. $M_{1\,2,3}$ represents the mutual inductance between coil 1 and 2 taken together and that of coil 3 and $C_{1\,2,3}$ represent the capacitance between coil 1,2 in the presence of coil 3. For a typical design, $M_{1\,2,3}$ was chosen as 4 microhenry, and $C_{1\,2,3}$ was chosen as 20 pf. When the selected values are submitted in the above infinite directionality expression $R_{OU} \times R_{LU} = 200{,}000$ ohms approximately. However, as stated above, $R_{OU}$ is approximately 50 ohms. Thus, $R_{LU}$ turns out to be a very large value impedance and can be omitted from terminal 66. Stated another way, one end of coil N3 is flaoted (that is, not connected to the broadband signal port) without adversely affecting the operation of the directional coupler transformer.

Still referring to FIG. 4, balun transformer 54 is designed so that $$Z_{OB} = \sqrt{L_1/C_M},$$

where $Z_{OB}$ is the characteristic impedance, $L_1$ represents the net mutual inductance and $C_M$ represents the mutual capacitance. In the preferred embodiment of the invention, $Z_{OB}$ is chosen to be 150 ohms which is the characteristic impedance of the twisted pair cable. This completes the detailed description of the F-coupler.

Several benefits inure to one who uses the disclosed invention and particularly the embodiments set forth in FIG. 4. Among the benefits are: balanced signals originating or terminating at the baseband ports, pass freely through the F-coupler and cable. Furthermore, because the signals are balanced, an oppositely poled magneto motive force (MMF) is canceled and does not induce into the broadband signal port.

(2) Unbalanced signals (representing noise and/or EMI) and originating from the baseband ports are enormously attenuated by the balun transformer and capacitance to ground and further by the directional coupler transformer since these signals travel in a direction which is contra-directional to either directional transformer 60.

(3) Unbalanced signal applied to the broadband signal ports couple freely in their respective directions toward and through the cable and are extracted by the directional transformer at the opposite end. Thus, only unbalanced signals pass freely and bidirectionally between the two broadband ports. Furthermore, no balanced signals can be injected from this port by the directional transformer because of the symmetry of the balanced windings N1 and N2 since N1=N2.

The combination of balun transformers and the capacitors 58 and 56 not only assists by attenuating unbalanced signals from passing from the baseband port to the broadband port, but together with the directional transformer (which is itself a balun) actually assists in further balancing the balanced signals.

(5) Because there is nothing limiting the bandwidth usage of the cable, the entire bandwidth for both broadband and baseband signals is possible. Operational models have been built allowing usage from virtually zero frequency to 1 GHZ. In these applications there may be a narrow overlapping zone at the DC end of the signal spectrum. This stems from the fact that DC signals cannot be coupled from the broadband signal port of the distribution link shown in FIG. 4.

The foregoing is considered as illustrative only of the principles of the present invention. Further, since numerous modifications and change will readily occur to those skilled in the art, it is the intention of the inventor that the invention not be limited to the exact construction and/or operation shown and described, and, accordingly, all suitable modifications and equivalents may be resorted to falling within the scope of the invention.

While the invention has been particularly shown and described with reference to the preferred embodiment thereof, it will be understood that various changes of form and details may be made therein without departing from the spirit and scope of the invention.

I claim:

1. An improved communications system for transmitting and receiving broadband and baseband information comprising:

a backbone communications network, said backbone communications network having a first sub-assembly network dedicated to transmit broadband signals representative of broadband information, a second sub-assembly network dedicated to transmit baseband signals representative of baseband information;

a distribution communications network for simultaneously transmitting and/or receiving broadband signals and baseband signals; and a circuit arrangement coupling the backbone communications network and the distribution communications network, said circuit arrangement having a filter circuit means connected in tandem with a broadband transformer with the windings of said transformer causing the baseband signals to be transmitted in a balanced mode and the broadband signals to be transmitted in an equally unbalanced mode.

2. The improved communications system of claim 1 further including a broadband connector connected to the broadband transformer and operable for connecting high frequency devices.

3. The improved communications system of claim 2 further including an RF splitter circuit connected to the broadband connector.

4. The improved communications system of claim 1 further including a baseband connector connected to the filter circuit means and operable for attaching devices which operate within the baseband frequency range.

5. The improved communications system of claim 1 wherein the first subassembly network includes a coaxial cable; a head end circuit arrangement for multiplexing signals from high frequency devices onto said coaxial cable, and a Tap/Combiner circuit arrangement coupled to said coaxial cable.

6. The communications system of claim 1 wherein the second subassembly includes a shielded twisted pair communications media, at least one multi-access unit connected to the media for distributing signals propagating on said media.

7. The communications system of claim 1 wherein the distribution communications network including at least one length of twisted pair communications media dedicated to provide communications services to an office; and a first circuit arrangement connected to the end of the communications media entering said office; said first circuit arrangement having a filter circuit means coupled in tandem with a broadband transformer with the winding of said transformer and the filter poled so that baseband signals are distributed in a balanced mode and broadband signals are distributed in an unbalanced mode.

8. In a communications system having a broadband network for transmitting high frequency electrical signals and a baseband network for transmitting relatively low frequency electrical signals an improved distribution communications network system for distributing the electrical signal comprising:
at least a length of communications media interconnecting an office with a wiring closet;
a pair of F-coupler modules one of each connected to opposite ends of the communications media, with each F-coupler module including a filter circuit connected in tandem with a broadband transformer with windings of said broadband transformer causing the high frequency electrical signals to be transmitted in an unbalanced mode and the relatively low frequency signals are transmitted in a balanced mode on said length of communications media.

9. An improved circuit arrangement for transmitting and receiving baseband and/or broadband electrical signals from a common communications media comprising:
a filter circuit configured to form a first input port for the baseband electrical signals;
a broadband transformer connected in tandem with the filter circuit, said broadband transformer having a plurality of windings arranged on a supporting corre with one of said windings forming a second port for receiving the broadband signals and the other windings forming an output port and causing the baseband electrical signals to be transmitted and delivered as balanced signals at the output port and the broadband electrical signals to be transmitted and delivered as unbalanced signals at said output port.

10. The improved circuit arrangement of claim 9 wherein the filter circuit includes a first coil having one end connected to the first input port and an opposite end connected to a series connected RC circuit; and
a second coil disposed in spaced relationship to the first coil and having one end connected to the first input port and an opposite end connected to a series connected RC circuit.

11. In a communications system having independent backbone networks for transmitting and/or receiving baseband signals and/or broadband signals and a distribution network for distributing the broadband and/or baseband signals into offices, a circuit module for multiplexing and/or demultiplexing broadband and/or baseband signals on the distribution network comprising: a first means coupled to said distribution network, said means receiving broadband signals and causing the broadband signals to propagate in an unbalanced mode on said distribution network; and
a second means coupled to the first means and operable for receiving the baseband signals and for propagating said baseband signals in a balanced mode over said distribution network whereby the first and second means cause the broadband signals and the baseband signals to propagate simultaneously on said distribution network.

12. The circuit module of claim 11 wherein the first means includes a balun transformer.

13. The circuit module of claim 12 wherein the balun transformer includes a magnetic core and two coils tightly wound on said magnetic core with the coils and core providing a characteristic impedance of $$Z_{OB} = \sqrt{L_1/C_M}$$

where $Z_{OB}$ is the characteristic impedance of a distribution link within the distribution network, $L_1$ represents the net mutual inductance and $C_M$ represents the mutual capacitance.

14. The circuit module of claim 13 wherein $Z_{OB}$ is approximately 150 ohms.

15. The circuit module of claim 11 wherein the second means includes a directional transformer.

16. The circuit module of claim 15 wherein the directional coupler transformer includes a magnetic core and three windings (N1, N2 and N3) positioned on said magnetic core with one of said windings N3 having a single ended output for connecting to an external device and spaced from N1 and N2 so that the windings are characterized by an impedance of $$Z_{OU} = \sqrt{L_U/C_{1,2,3}}$$

and the other two windings N1 and N2 being connected to the distribution network and characterized by an impedance of $$Z_{OB} = \sqrt{L_B/C_{1,2}}$$

where $Z_{OB}$ represents a characteristic impedance for balanced signals on the distribution link within the distribution network, $Z_{OU}$ represents characteristic impedance for unbalanced signals on the distribution link of said distribution networks, $L_B$ represents mutual inductance between windings N1 and N2.

$L_U$ represents the net mutual inductance between windings N1 and N2 together and that of winding N3.

$C_{1,2,3}$ represents mutual capacitance between N1 N2, and N3.

$C_{1,2}$ represents mutual capacitance between N1 and N2 in the presence of winding N3.

17. The circuit module of claim 16 wherein $Z_{OB}$ is approximately 150 ohms and $Z_{OU}$ is approximately 50 ohms.

18. An improved communications system for transmitting and receiving broadband and baseband information comprising:

a backbone communications network, said backbone communications network having a first sub-assembly network dedicated to transmit broadband signals representative of broadband information, a second sub-assembly network coupled to the first sub-assembly network and dedicated to tranamit baseband signals representative of baseband information;

a distribution communications network for simultaneously transmitting and/or receiving a broadband signals and baseband signals; and a circuit arrangement interconnecting the backbone communications network and the distribution communications network, said circuit arrangement having a first circuit means coupled in tandem with a second circuit means with the first and second circuit means coacting so that baseband signals are propagated on the distribution communications network in a balanced mode and the broadband signals are propagated in an unbalanced mode.

19. In a communications system having a broadband network for transmitting high frequency electrical signals and a baseband network for transmitting relatively low frequency electrical signals an improved distribution communications network for distributing the electrical signals comprising:

at least a length of communications media interconnecting an office with a wiring closet;

a pair of F-coupler modules one of each connected to opposite ends of the communications media, with each F-coupler module including a balun transformer connected in tandem with a directional transformer with selected windings of said transformers causing the high frequency electrical signals to be transmitted in an unbalanced mode and the relatively low frequency signals to be transmitted in a balanced mode on said length of communications media.

20. An improved circuit arrangement for transmitting and receiving baseband and/or broadband electrical signals from a common communications media comprising:

a balun transformer configured to form a first input port for the baseband electrical signals;

a directional transformer connected in tandem with the balun transformer, said balun transformer having a supporting core, three windings N1, N2 and N3 arranged thereon with one of said windings forming a second single ended port for the broadband signals and the other two windings forming an output port and coacting with windings of the balun transformer so that baseband electrical signals are propagates as balanced signals at the output port and the broadband electrical signals are propagated as unbalanced signals at said second port.

21. An improved communications system for transmitting and receiving broadband and baseband information comprising:

a backbone communications network, said backbone communications network having a first sub-assembly network dedicated to transmit broadband signals representative of broadband information, a second sub-assembly network coupled to the first sub-assembly network and dedicated to transmit baseband signals representative of baseband information;

a distribution communications network for simultaneously transmitting and/or receiving broadband signals and baseband signals; and a circuit arrangement coupled the backbone communications network and the distribution communications network, said circuit arrangement having a balun transformer connected in tandem with a directional transformer with windings of said transformers coacting so that baseband signals are distributed in a balanced mode and the broadband signals are distributed in an equally unbalanced mode.

22. In a communications system having a first network for transmitting high frequency electrical signals and a second network for transmitting high frequency electrical signals an improved distribution communications network system for distributing the electrical signals comprising:

at least a length of communications media;

a pair of F-coupler modules one of each connected to opposite ends of the communications media, with each F-coupler module including a balun transformer connected in tandem with a directional coupler transformer with windings of said directional coupler transformer and said balun transformer poled and arranged in the path of the communications media so that high frequency electrical signals from said first and second networks are transmitted in an unbalanced mode and balanced mode with said high frequency electrical signals propagating simultaneously and occupying the same frequency bands on said communications media.

23. The improved distribution network system of claim 22 wherein the communications media includes twisted pair electrical conductors.

24. The improved communications system of claim 21 wherein the backbone communications network is formed with a plurality of different media types including optical fiber, twisted pair cable and coax.

25. An improved communicatons system for transmitting and receiving broadband and baseband information comprising:

a backbone communications network, said backbone communications network having a first sub-assembly network dedicated to transmit broadband electrical signals representative of broadband information, a second sub-assembly network coupled to the first sub-assembly network and dedicated to transmit baseband electrical signals representative of baseband information;

means associated with the backbone communications network and operable for partitioning and distributing the broadband signals;

a distribution communications network for simultaneously transmitting and/or receiving broadband signals and baseband signals; and a circuit arrangement coupling the backbone communications network and the distribution communications network, said circuit arrangement having a balun transformer connected in tandem with a directional coupler transformer with windings of said transformers coacting so that the circuit arrangement exercises its filtering characteristics on base band electrical signals and exercises its directivity characteristics on broad band electrical signals.

26. The circuit arrangement of claim 9 wherein the broadband transformer includes three windings symmetrically arranged on the supporting core.

* * * * *